United States Patent
Delavaux et al.

(10) Patent No.: US 6,583,925 B1
(45) Date of Patent: Jun. 24, 2003

(54) EFFICIENT PUMPING FOR HIGH POWER RARE-EARTH DOPED FIBER AMPLIFIERS

(75) Inventors: Jean-Marc Pierre Delavaux, Pittstown, NJ (US); Sandra Greenberg Kosinski, Murray Hill, NJ (US); Aydin Yeniay, North Plainfield, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/471,978

(22) Filed: Dec. 23, 1999

(51) Int. Cl.$^7$ ............................................. H04B 10/12
(52) U.S. Cl. ............................................. 359/341.32
(58) Field of Search ............................ 359/134, 160, 359/341, 345; 372/38.06, 70

(56) References Cited

U.S. PATENT DOCUMENTS

| | | | | |
|---|---|---|---|---|
| 5,253,104 A | * | 10/1993 | Delavaux | 359/174 |
| 5,392,153 A | * | 2/1995 | Delavaux | 359/341.3 |
| 5,506,723 A | * | 4/1996 | Junginger | 359/134 |
| 5,623,508 A | * | 4/1997 | Grubb et al. | 372/3 |
| 5,808,786 A | * | 9/1998 | Shibuya | 359/341.33 |
| 6,008,933 A | * | 12/1999 | Grubb et al. | 359/134 |
| 6,011,644 A | * | 1/2000 | Button et al. | 359/341.32 |
| 6,052,220 A | * | 4/2000 | Lawrence et al. | 359/33 |
| 6,304,368 B1 | * | 10/2001 | Hansen et al. | 359/134 |
| 6,317,254 B1 | * | 11/2001 | Park et al. | 359/341.33 |
| 6,333,810 B1 | * | 12/2001 | Yoon et al. | 359/341.32 |

FOREIGN PATENT DOCUMENTS

| | | | |
|---|---|---|---|
| EP | 0641051 A1 | 1/1995 | ............. H01S/3/06 |
| EP | 0 779 687 A3 | 4/1999 | |

OTHER PUBLICATIONS

Becker et al. Erbium–Doped Fiber Amplifiers Fundamentals and Technology. Academic Press. 1999. pp. 251–319.*

Lee et al. Enhancement of Power Conversion Efficiency for an L–Band EDFA with Secondary Pumping Effect in the Unpumped EDF Section. IEEE Photonics Technology Letters, vol. 11, No. 1, Jan. 1999. pp. 42–44.*

M. Karasek, "Analysis of Gain Improvement of PR +–Doped Flouride Fibre Amplifiers Using an Optical Filter or Isolator", Optics Communications, North–Holland Publishing Co. Amsterdam, NL, vol. 107, No. 314, Apr. 15, 1994, pp. 235–239.

* cited by examiner

Primary Examiner—Thomas H. Tarcza
Assistant Examiner—Deandra M. Hughes
(74) Attorney, Agent, or Firm—Wendy W. Koba

(57) ABSTRACT

A fiber amplifier, such as a rare-earth doped fiber amplifier, includes at least two separate sections of (doped) fiber, where residual pump power remaining in one stage (for example, the output stage) of the amplifier is coupled into, and re-used by, the remaining section of (doped) fiber. In particular, a second, longer section of fiber is directly pumped by an externally supplied pump signal and a first, shorter section of doped fiber uses residual pump power from the second section as a pump signal input.

12 Claims, 12 Drawing Sheets

EFFICIENT PUMPING FOR HIGH POWER RARE-EARTH DOPED FIBER AMPLIFIERS

TECHNICAL FIELD

The present invention relates to the field of rare-earth doped fiber amplifiers and, more particularly, to an efficient use of residual pump power within the amplifier arrangement.

BACKGROUND OF THE INVENTION

In the last decade, rare-earth doped fiber amplifiers in general, and erbium doped fiber amplifiers (EDFAs) in particular, have been extensively used in optical telecommunication systems as a means to amplify weak optical signals between telecommunications links, particularly signals at or near the 1550 nm wavelength. Various designs of these amplifiers have been proposed to provide efficient performance, where efficiency is measured in terms of high optical gain, low noise figure, high output power and pump efficiency. Recently, with the use of EDFAs in new applications such as multiple WDM systems and analog CATV systems, high optical power (along with low noise) has become essential in order to overcome the splitting losses and to have relatively high optical powers at receivers. High power levels can be achieved by increasing the pump power near the 980 nm or 1480 nm wavelengths. However, the semiconductor lasers conventionally used to emit at these wavelengths are problematic in terms of power scalability and overall lifetime.

As an alternative to providing an increased power for these newer applications, co-doping of the fiber amplifier has been proposed, where in most cases a co-doping of $Er^{+3}$ and $Yb^{+3}$ is used. Such a co-doping increases the amount of pump absorption and offers a flexibility in selection of the pump wavelength, owing to the broad absorption band of $Yb^{+3}$ (from 800 to 1100 nm) in glass. In glass fibers which contain phosphorus, ytterbium can absorb pump power available from diode-pumped Yb or Nd-doped laser sources near 1064 nm and efficiently transfer the energy to erbium ions for power application near 1550 nm. To date, several fiber amplifiers with $Er^{+3}$—$Yb^{+3}$ co-doping that are pumped with a 1064 nm Yb or Nd-cladded pumping lasers have been demonstrated with co-, counter-, or side-pumping schemes.

Figure 1:
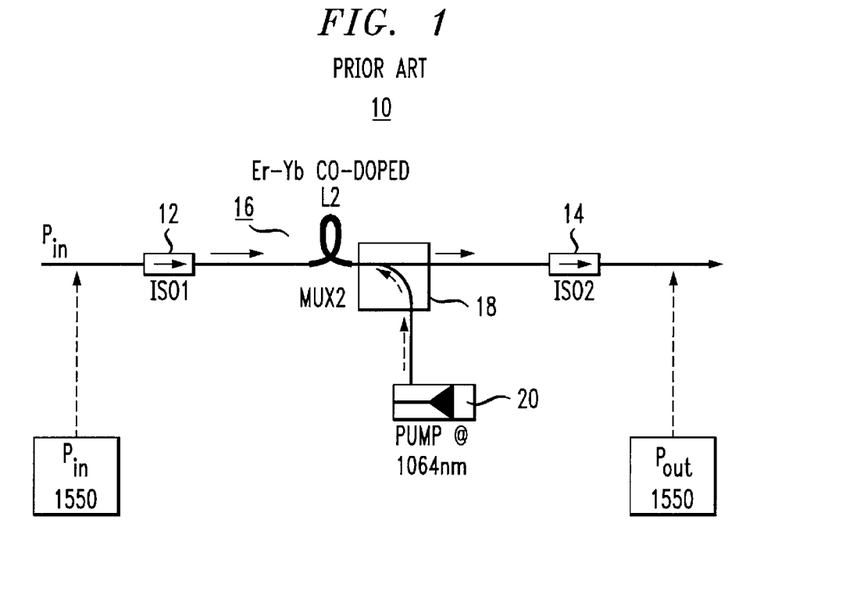
FIG. 1, as described above, is a conventional prior art doped fiber amplifier arrangement.
Figure 2:
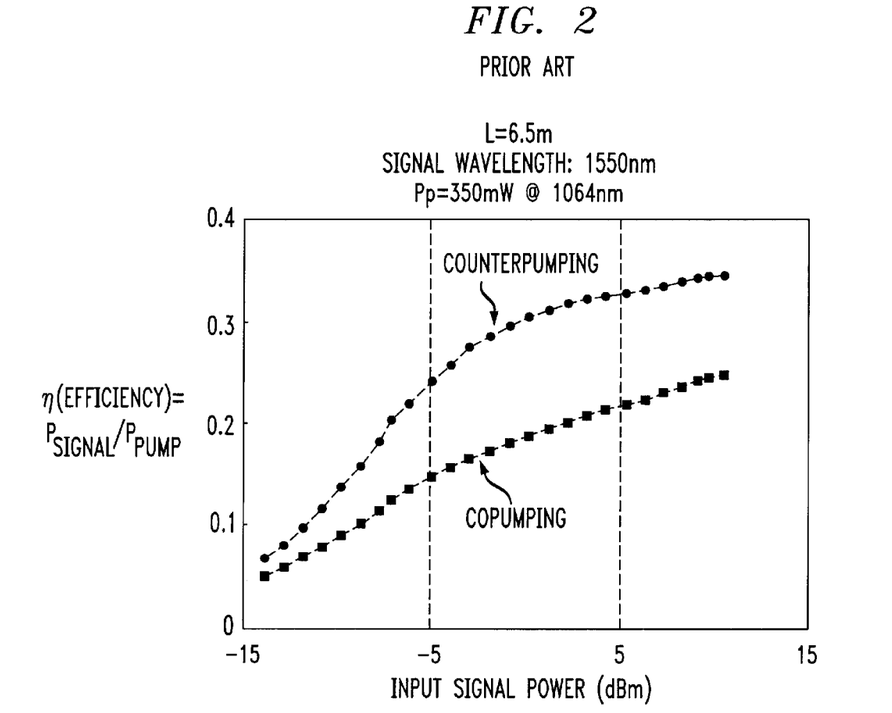
FIG. 2 is a graph of typical prior art results comparing a counter-pumped fiber amplifier efficiency to the efficiency of a co-pumped fiber amplifier.

In general, a conventional $Er^{+3}$—$Yb^{+3}$ doped fiber amplifier consists of a pump, multiplexer, $Er^{+3}$—$Yb^{+3}$ doped fiber and an isolator. FIG. 1 illustrates an exemplary prior art doped fiber amplifier 1 0, which is capable of producing optical power on the order of a few watts. As shown, amplifier 10 includes an input isolator 12 and output isolator 14, with a section of co-doped $Er^{+3}$—$Yb^{+3}$ fiber 16 disposed therebetween. A wavelength division multiplexer 18 is used to couple a pump source 20 (such as, for example, a diode-pumped laser emitting at 1064 nm) into fiber amplifier 16. An input optical signal $P_{in}$ (at a wavelength of, for example, 1550 nm) is applied as an input through isolator 12 to doped fiber section 16. As shown in FIG. 1, the propagation direction of the pump signal from source 20 is opposite that of input signal $P_{in}$. Such an arrangement is commonly referred to as a "counter-pumping" amplifier. In a co-pumped amplifier, the pump signal and input signal both travel through the doped fiber in the same direction. In most cases, a counter-pumping arrangement is preferred since it provides a better optical efficiency (although co-pumping yields a lower noise figure). FIG. 2 contains a graph of efficiency (measured in terms of the ratio of the signal power to the pump), as a function of input signal power (dBm). Where the signal is high, the power can be extracted more efficiently. Therefore, the higher pump power is where the signal has been amplified. This improved efficiency can be attributed to the fact that $Er^{+3}$ clusters in the fiber medium can be bleached more efficiently when the pump and signal propagate in opposite directions, resulting in more ions contributing to the Amplified. Spontaneous Emission (ASE), as well as improved efficiency.

Figure 3:
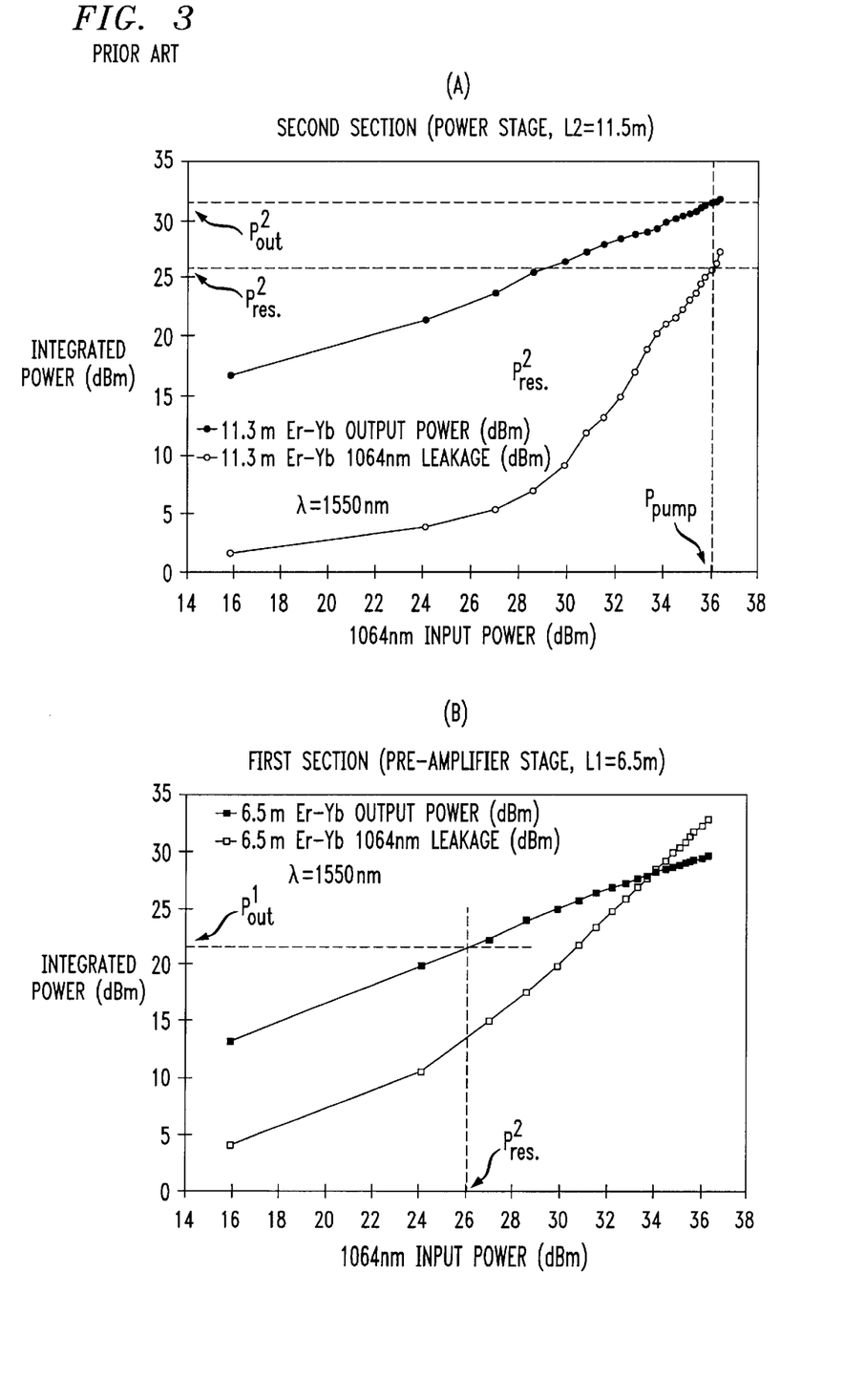
FIG. 3(A) is a graph illustrating the amount of residual pump power available as a function of the input power of the pump signal.
FIG. 3(B) is a graph illustrating the output power associated with using residual pump power to amplify an optical input signal.

For a given length of $Er^{+3}$—$Yb^{+3}$ doped fiber, the output power ($P_{out}$) increases linearly as a function of the injected pump power (for a constant input signal power), as shown in FIG. 3. This increase in output power continues even in deep compression of the gain medium by the high pump power. On the other hand, this increase of the pump power also results in high residual power at the end of the fiber. The residual pump power in an $Er^{+3}$—$Yb^{+3}$ doped fiber amplifier operating in a high saturation regime is quite high when compared to a conventional $Er^{+3}$ doped fiber amplifier where excited state absorption (ESA) also extracts energy from the pump, reducing further optical efficiency as the 980 nm pump power increases. Therefore, in $Er^{+3}$—$Yb^{+3}$ fiber amplifiers, high residual pump power at 1064 nm is problematic, particularly for multistage amplifier designs, where this residual power may be harmful to other optical components in the system. Referring to FIG. 3(A), at an output power of 32 dBm, a residual pump power of 26 dBm remains (for an input pump power of 36 dBm), using a doped fiber section having a length of 11.5 m. Thus, a need remains in the art for providing the improved efficiencies offered by a co-doped $Er^{+3}$—$Yb^{+3}$ fiber amplifier, while reducing (or eliminating) the residual pump power associated with such an arrangement.

SUMMARY OF THE INVENTION

The need remaining in the prior art is addressed by the present invention, which relates to the field of rare-earth doped fiber amplifiers and, more particularly, to an amplifier arrangement including efficient re-use of residual pump power within the amplifier.

In accordance with the present invention, a fiber amplifier is formed to comprise at least two sections of rare-earth doped optical fiber. A pump source is coupled to one section of fiber, where the residual pump power at the exit of this section of fiber is thereafter redirected to a WDM (wavelength division multiplexer) which applies this residual pump as the pump signal input to the remaining co-doped section of fiber; the length of the fiber being determined based upon the amount of residual power present at the output of the second section. In the preferred embodiment, the pump signal is coupled to the second fiber section and the residual pump power is coupled into the first section.

In an alternative, multistage embodiment, a pump source is directly applied to the final stage of the amplifier (that is, to the final section of co-doped fiber), with the residual power applied as the pump input to the preceding stage. The residual power remaining after amplification at this stage is then similarly coupled into the prior stage, and continuing in a like manner to efficiently use all of the available pump power. In these arrangements, the length of fiber in each stage decreases from the final stage to the first stage. Multiple pump sources can also be used, with each residual pump applied as an input to another section.

Various embodiments of the present invention are possible, including co-pumped, counter-pumped and side pumping, and various combinations of the above, as described in detail in association with the following illustrations.

BRIEF DESCRIPTION OF THE DRAWINGS

Referring now to the drawings, where like numerals represent like parts in several views.

DETAILED DESCRIPTION

Throughout the course of the following discussion, the subject matter of the present invention will be discussed in the context of an $Er^{+3}$—$Yb^{+3}$ doped optical fiber amplifier. It is to be understood that various other compositions are well-known in the art to be used as dopants for an optical fiber amplifier. For example, praseodymium is another dopant that may be used (either alone or in association with erbium or other rare-earth dopants). Various other combinations are possible and all may be used in the "residual" pump coupling system of the present invention, since each dopant composition will result in residual power existing within a particular stage of a fiber amplifier. Further, other types of fiber amplifiers, such as Raman amplifiers and parametric amplifiers may utilize the "pump re-cycling" teachings of the present invention.

Figure 4:
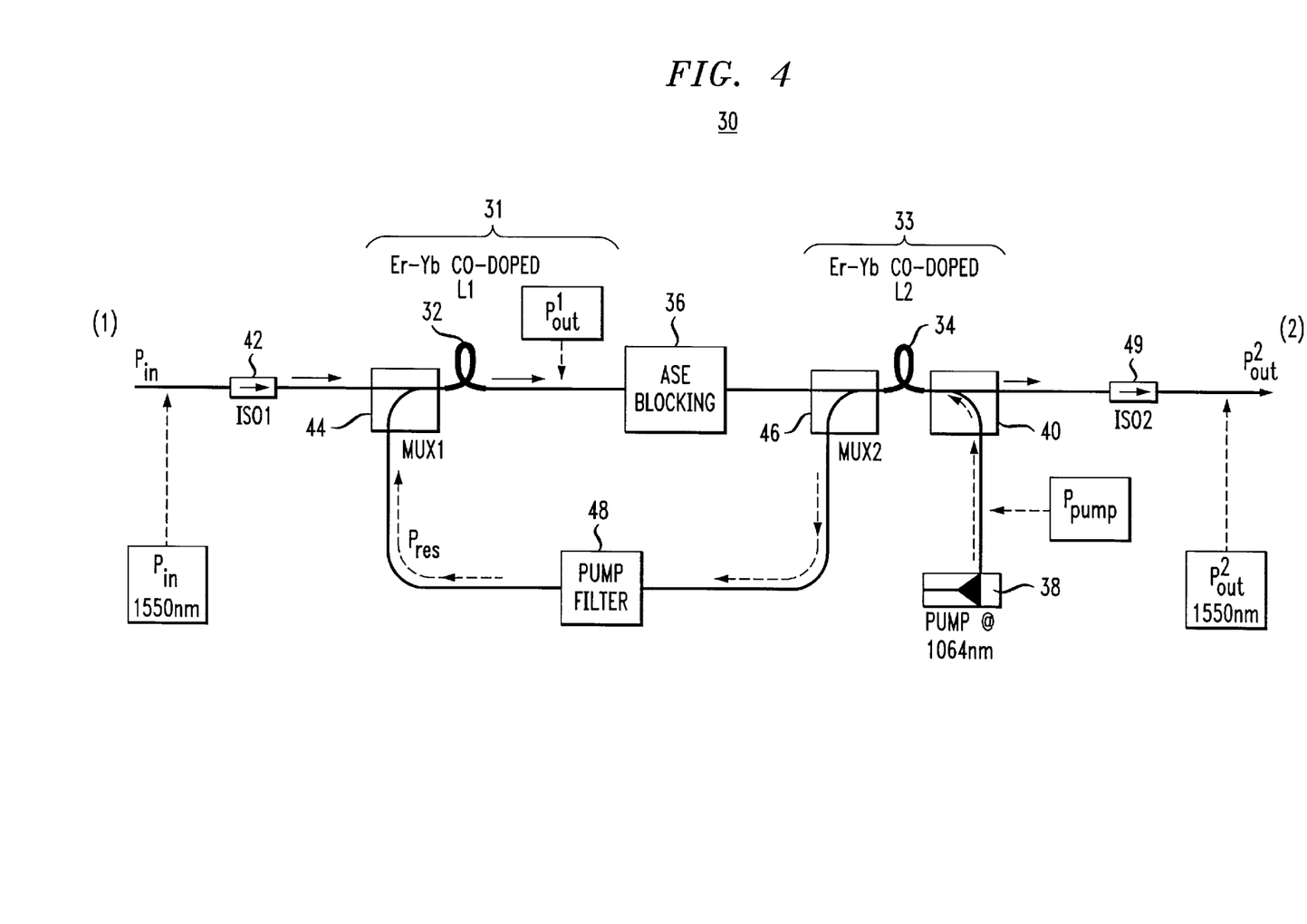
FIG. 4 illustrates an exemplary two-stage $Er^{+3}$—$Yb^{+3}$ fiber amplifier of the present invention in a counter-pumped arrangement with the residual pump power in the second stage applied as the pump input (co-pumped) to the first stage.

An exemplary two-stage $Er^{+3}$—$Yb^{+3}$ doped fiber amplifier 30 formed in accordance with the present invention is illustrated in FIG. 4. As shown, fiber amplifier includes an input stage 31 and an output stage 33, with input stage 33 comprising a first section 32 of co-doped $Er^{+3}$—$Yb^{3}$ fiber, having a length L1. Output stage 33, as shown, includes section 34 of co-doped $Er^{+3}$—$Yb^{+3}$ fiber, having a length L2>L1. The difference in length between the two sections is a factor to be used in determining the amount of amplification that is desired or expected in the amplifier. Indeed, the requirement that L2>L1 presumes that each fiber amplifier comprises the same dopant scheme, which is not necessarily true and is not required to practice the present invention. For the purposes of discussion related to the various embodiments described hereinafter, it will be presumed that each fiber section comprises essentially identical dopant characteristics and, therefore, length of each section can be used as a parameter in designing the amplifier requirements. Disposed between input stage 31 and output stage 33 is a blocking device 36, which may comprise an isolator, filter or other arrangement capable of blocking amplified spontaneous emission (ASE) between the two stages. A pump source 38 is used to provide a pump signal $P_{pump}$ (operating at an appropriate wavelength, for example, 1064 nm) as an input to second co-doped fiber section 34. In the arrangement as shown in FIG. 4, a wavelength division multiplexer 40 (herein after generally referred to as a "multiplexer", where the wavelength division/combination nature of each multiplexer will be presumed) is disposed at the output of second fiber section 34 and is used to couple pump signal $P_{pump}$ into second fiber section 34 in a counter-propagating direction with respect to input signal $P_{in}$. As shown, input signal $P_{in}$ (which may be, for example, a signal at 1550 nm) first passes through an input isolator 42 (used to prevent residual signal and ASE from propagating back into the transmission source) and thereafter applied as an input through a multiplexer 44 into first fiber section 32 of input amplifier stage 31.

In accordance with the teachings of the present invention, the pump signal input to input stage 31 stage of amplifier 30 is the residual pump signal $P_{res}$ remaining at the output of second fiber section 34. Referring to FIG. 4, a multiplexer 46 is disposed between ASE blocking device 36 and second fiber section 34 to capture residual pump power $P_{res}$. This residual power is then applied as the second input to multiplexer 44 and used as a co-propagating pump input for first fiber section 32. By properly controlling the lengths L1 and L2 of fiber sections 32 and 34, respectively, the residual power will be sufficient to provide amplification within the input stage 31 of amplifier 30. In particular, and with reference to FIG. 3(A), second fiber section 34 may comprise a length L2 of 11.5 m. Using a 36 dBm power pump signal, section 32 is capable of producing a 32 dBm power output signal, denoted $P^2_{out}$, with a 26 dBm residual pump power. Therefore, first fiber section 32 can be sized so as to most efficiently use this 26 dBm pump power, where a 6.5 m length has been found to be most efficient. In this case, first fiber section 32 is capable of providing 22 dBm output power to applied input signal $P_{in}$, this forming a first amplified output signal $P^1_{out}$, as illustrated in the graph of FIG. 3(B).

As shown in FIG. 4, an additional bandpass filter 48 (or isolator, or a combination of a filter and isolator) may be disposed in the residual pump path between multiplexer 44 and multiplexer 46 to prevent the ASE, as well as other undesired signal wavelengths, at the output of second fiber section 34 from being coupled into first fiber section 32. Similar to most conventional fiber amplifier arrangements, an output isolator 49 is disposed beyond second fiber section 34 to prevent optical reflections and/or block residual pump power from final amplified output signal $P^2_{out}$.

Figure 5:
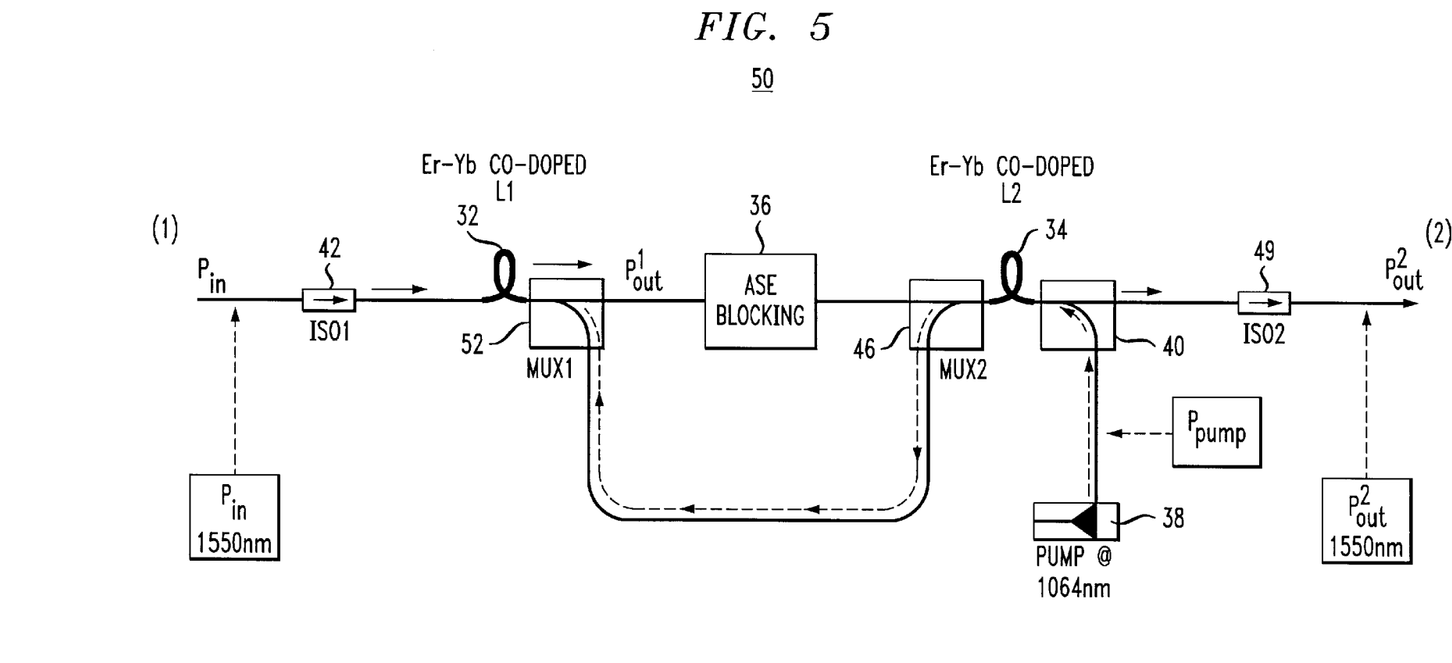
FIG. 5 illustrates an alternative embodiment to the amplifier depicted in FIG. 4, where the residual pump is applied as a counter-pumped input to the first stage.

The use of a co-pumping arrangement in the first stage of amplifier 30 of FIG. 4 yields a relatively low noise figure (in the range of, for example, 4 dB) at the output of input stage 31. As discussed above, however, the use of a counter-propagating pump signal has been found to provide improved conversion efficiency. Therefore, an amplifier of the present invention may be formed to use counter-propagating pump signals for both stages, as shown in FIG. 5. In this arrangement, a two-stage $Er^{+3}$—$Yb^{+3}$ co-doped fiber amplifier 50 is shown to be very similar to the arrangement discussed above in association with FIG. 4, the difference being the use of a counter-propagating residual pump signal input $P_{res}$ with first fiber section 32. A multiplexer 52 is disposed in the signal path between first fiber section 32 and ASE blocking device 36 and is therefore capable of applying residual signal $P_{res}$ in a counter-propagating direction with respect to input signal $P_{in}$.

Figure 6:
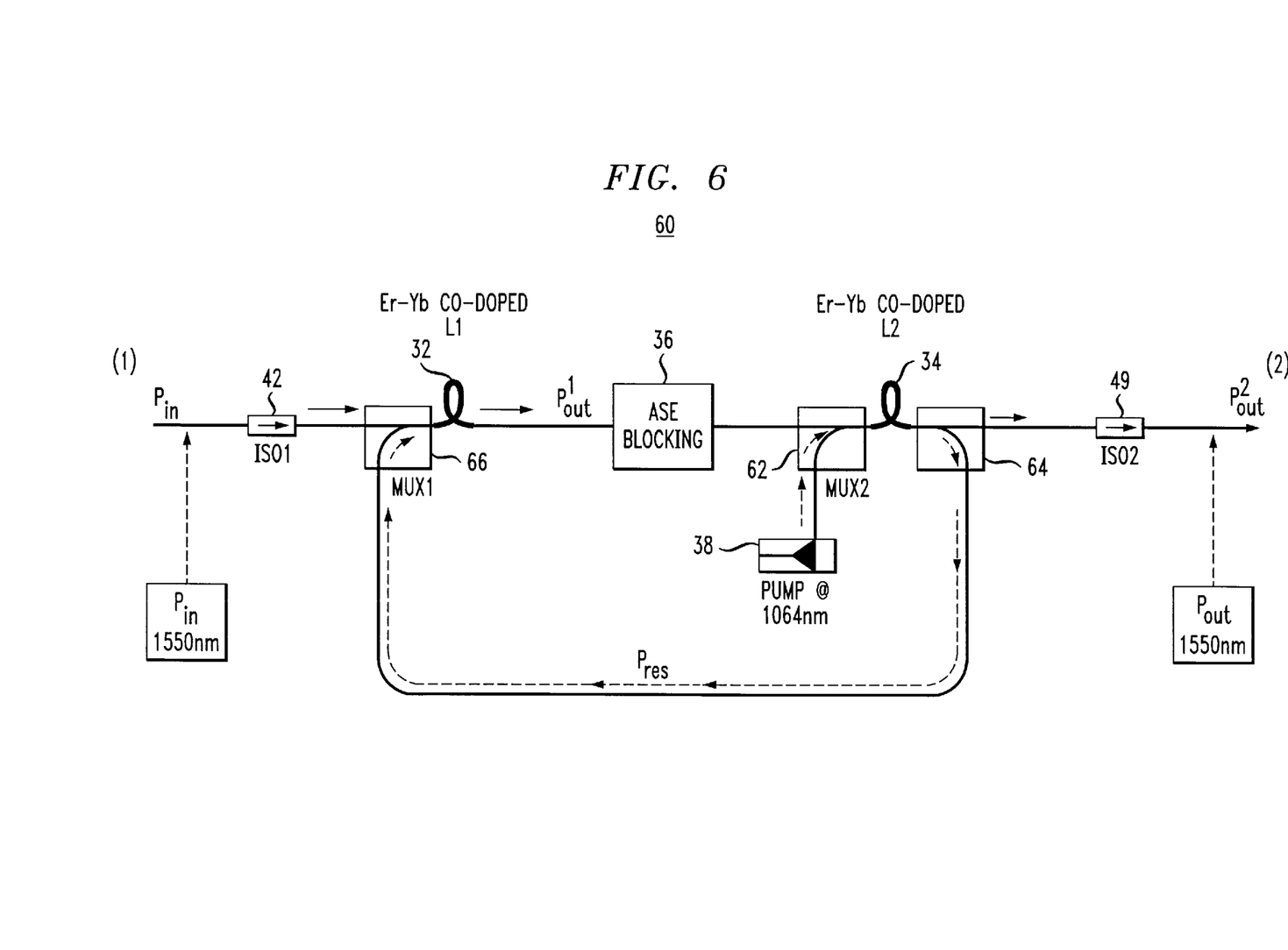
FIG. 6 illustrates another alternative to the arrangement of FIG. 4, in this case both pump signals applied as co-propagating with the input signal.

An alternative two-stage $Er^{+3}$—$Yb^{+3}$ co-doped fiber amplifier 60 using pump signals applied in a co-propagating arrangement, is illustrated in FIG. 6. In this case, pump signal $P_{pump}$ from pump source 38 is applied as an input to a second fiber section 34, via a multiplexer 62, so as to propagate in the same direction as the applied input signal, $P^1_{out}$. As shown, multiplexer 62 is disposed in the signal path between ASE blocking device 36 and second fiber section 34. A second multiplexer 64 is disposed at the output of second fiber section 34 (prior to output isolator 49) and is used to remove the residual pump power signal $P_{res}$. This residual pump signal is thereafter coupled through a third multiplexer 66 into the input of first fiber section 32. In general, any combination of co-pumping and counter-pumping of the "original" pump signal $P_{pump}$ and residual pump signal $P_{res}$ can be used in the co-doped fiber amplifier arrangement of the present invention.

Figure 7:
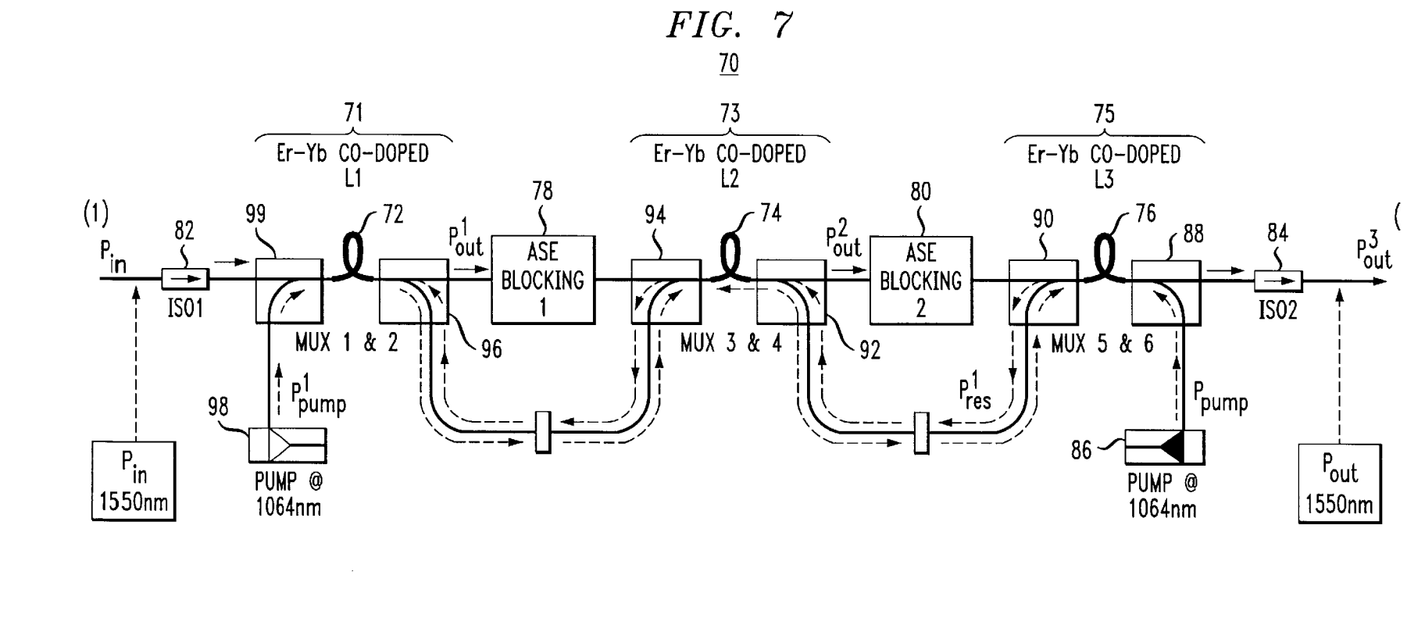
FIG. 7 illustrates a three-stage $Er^{+3}$—$Yb^{+3}$ fiber amplifier formed in accordance with the present invention, utilizing a pair of pump sources applied as inputs to the first and third stages, with the residual pump power from these stages applied as the pump signal input to the intermediate stage.

An exemplary three-stage $Er^{+3}$—$Yb^{+3}$ co-doped fiber amplifier 70 formed in accordance with the present invention is illustrated in FIG. 7. As shown, amplifier 70 includes a first stage 71, a second stage 73 and a third stage 75, each stage including a separate section of co-doped $Er^{+3}$—$Yb^{+3}$ optical fiber; first stage 71 including a first section of length L1, second stage 73 including a second section 74 of length L2, and third stage 75 including a third section 76 of length L3, where, for example, L3>L2>L1 in an exemplary embodiment using fiber having essentially identical characteristics to form each section. A first ASE blocking filter 78 is disposed between first stage 71 and second stage 73, and a second ASE blocking filter 80 is disposed between second stage 73 and third stage 75, where as discussed above, these filters function to prevent amplified spontaneous emission (ASE) from propagating through the amplifier and corrupting the amplified input signal $P_{in}$. As with the arrangement described above, an input isolator 82 is disposed at the input of first stage 71 (to prevent any counter-propagating residual pump signal from entering a transmission source) and an output isolator 84 is disposed at the output of third stage 75 (to prevent any reflected signal from entering the amplifier, as well as preventing any co-propagating residual pump signal from exiting amplifier 70). In general, an input signal $P_{in}$ (at 1550 nm, for example) passes through input isolator 82, is amplified in first stage 71 to produce a first amplified output signal $P^1_{out}$, passes through first ASE blocking filter 78 and is amplified again in second stage 73 to become second amplified output signal $P^2_{out}$. Second amplified output signal $P^2_{out}$ then passes through second ASE blocking filter 80 and is amplified again in third stage 75 to provide the final output signal $P^3_{out}$.

In accordance with the present invention, a pump source 86 is used to provide a pump signal $P_{pump}$ at a wavelength of 1064 nm. As shown in FIG. 7, pump signal $P_{pump}$ is coupled, via a multiplexer 88, as a counter-propagating input to third stage 75 of amplifier 70. The residual pump power $P^1_{res}$ at the termination of third fiber section 76 is coupled, as shown, into a multiplexer 90 and is thereafter coupled, via a multiplexer 92, into second fiber section 74 as a counter-propagating pump input to second stage 73 of amplifier 70. By properly controlling the length L2 of second fiber section 74, a predetermined amount of residual power, denoted $P^2_{res}$ will remain at the termination of second fiber section 74. This second residual pump signal $P^2_{res}$ can therefore be extracted with a multiplexer 94 and applied as a counter-propagating pump signal (via a multiplexer 96) input to first stage 71 of amplifier 70.

In an alternative embodiment of amplifier 70, a second pump source (illustrated in phantom in FIG. 7 as pump source 98) can be applied as an input to first stage 71 (via a multiplexer 99, illustrated in phantom in FIG. 7), where the length L1 of first fiber section is adjusted so as to yield a residual pump power, where the residual powers from first stage 71 and third stage 75 may be applied as co- and counter-pumping signals, respectively, to second stage 73. Second pump power 98 may comprise a pump source operating at a different wavelength (for example, 980 nm), depending upon the dopant species used within the fiber.

Figure 8:
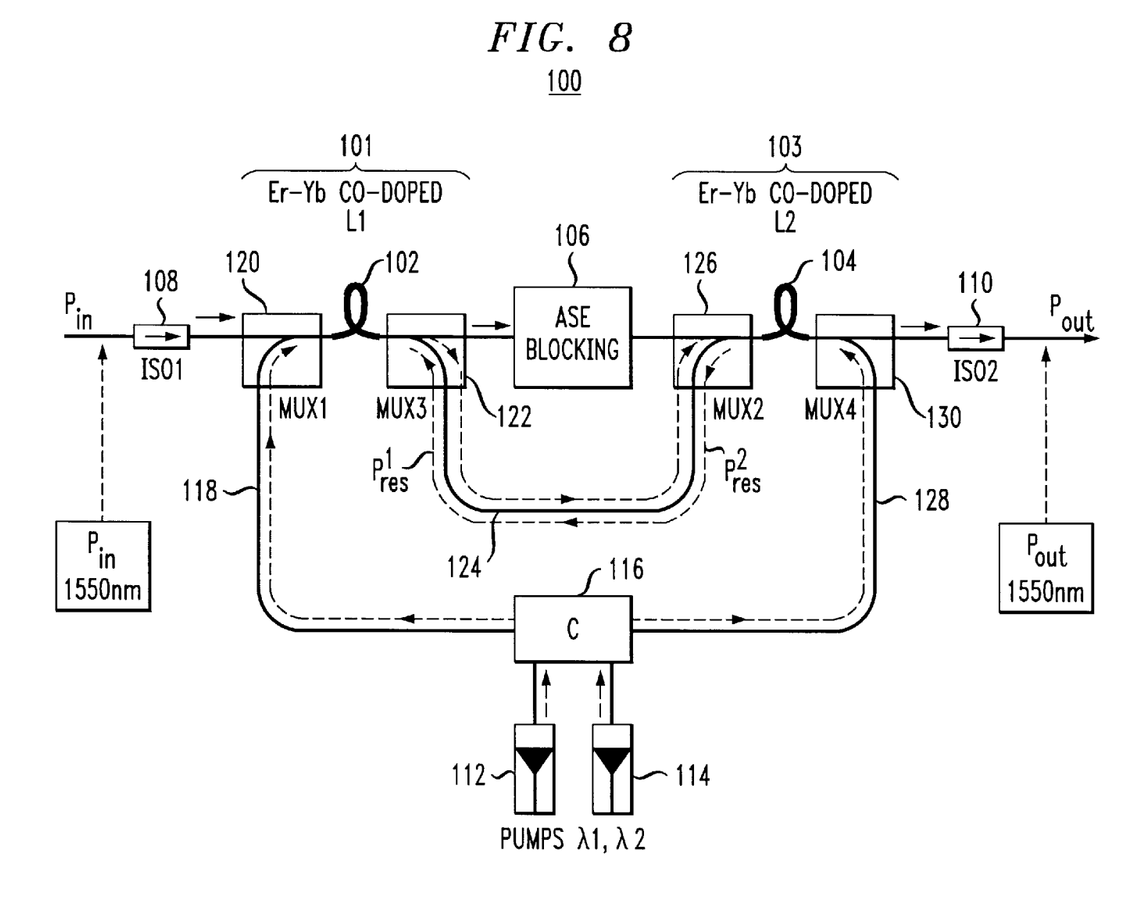
FIG. 8 illustrates an alternative two-stage embodiment of an $Er^{+3}$—$Yb^{+3}$ fiber amplifier, using a pump splitting arrangement to provide direct pump signals to both stages and "recycling" the residual power to the opposite stages.

FIG. 8 illustrates an alternative two-stage $Er^{+3}$—$Yb^{+3}$ co-doped fiber amplifier 100, including an input stage 101 and an output stage 103. Input stage 101 comprises a first section 102 of $Er^{+3}$—$Yb^{+3}$ co-doped fiber of length L1, and output stage 103 comprises a second section 104 of $Er^{+3}$—$Yb^{+3}$ co-doped fiber of length L2, where L2>L1 (for maximum efficiency when each fiber comprises essentially identical characteristics). An ASE blocking element 106 is disposed between input stage 101 and output stage 103, with an input isolator 108 coupled to the input of input stage 101 (to prevent any residual pump signal from propagating further back along the transmission path) and an output isolator 110 coupled to the output of output stage 103 (to prevent any residual pump signal from propagating further along the transmission path). As shown, a pair of separate pump sources 112 and 114 are applied as separate inputs to a coupling element 116, where coupling element 116 combines/redirects the pump signals, as will be described in detail below in association with FIGS. 9A–9C, to provide a separate pair of pump signal inputs to input stage 101 and output stage 103. A first pump output signal $P^1_{pump}$ is shown as propagating along an optical signal path 118 and thereafter applied as an input through a multiplexer 120 to input stage 101. In the embodiment as shown in FIG. 8, multiplexer 120 is disposed between input isolator 108 and first fiber section 102. Therefore, pump signal $P^1_{pump}$ will be co-propagating with input signal $P_{in}$. The amplified signal output from first stage 101, denoted $P^1_{out}$ will thereafter pass through ASE blocking element 106 and be applied as an input to output stage 103. Any residual pump power from the first pump output signal (the residual power being denoted as $P^1_{res}$) will be captured by a multiplexer 122 at the output of input stage 101 and directed to propagate along optical signal path 124. Thereafter, residual pump signal $P^1_{res}$ will be directed by a multiplexer 126 into second stage 103 and used a pump input for second fiber section 104.

A second pump output signal $P^2_{pump}$ is shown as exiting from coupling element 116 and propagating along another optical signal path 128 and then coupled, via a multiplexer 130 as a counter-propagating pump signal input to second stage 103. Residual pump power, denoted $P^2_{res}$, will then exit second stage 103 via multiplexer 126 and thereafter propagate through optical signal path 124 and be coupled, via multiplexer 122, into first stage 101 as a counter-propagating pump signal. A pair of isolators (not shown) can be inserted along signal paths 118 and 128 to prevent any of the residual pump signals from propagating back into coupling element 116.

Figure 9:
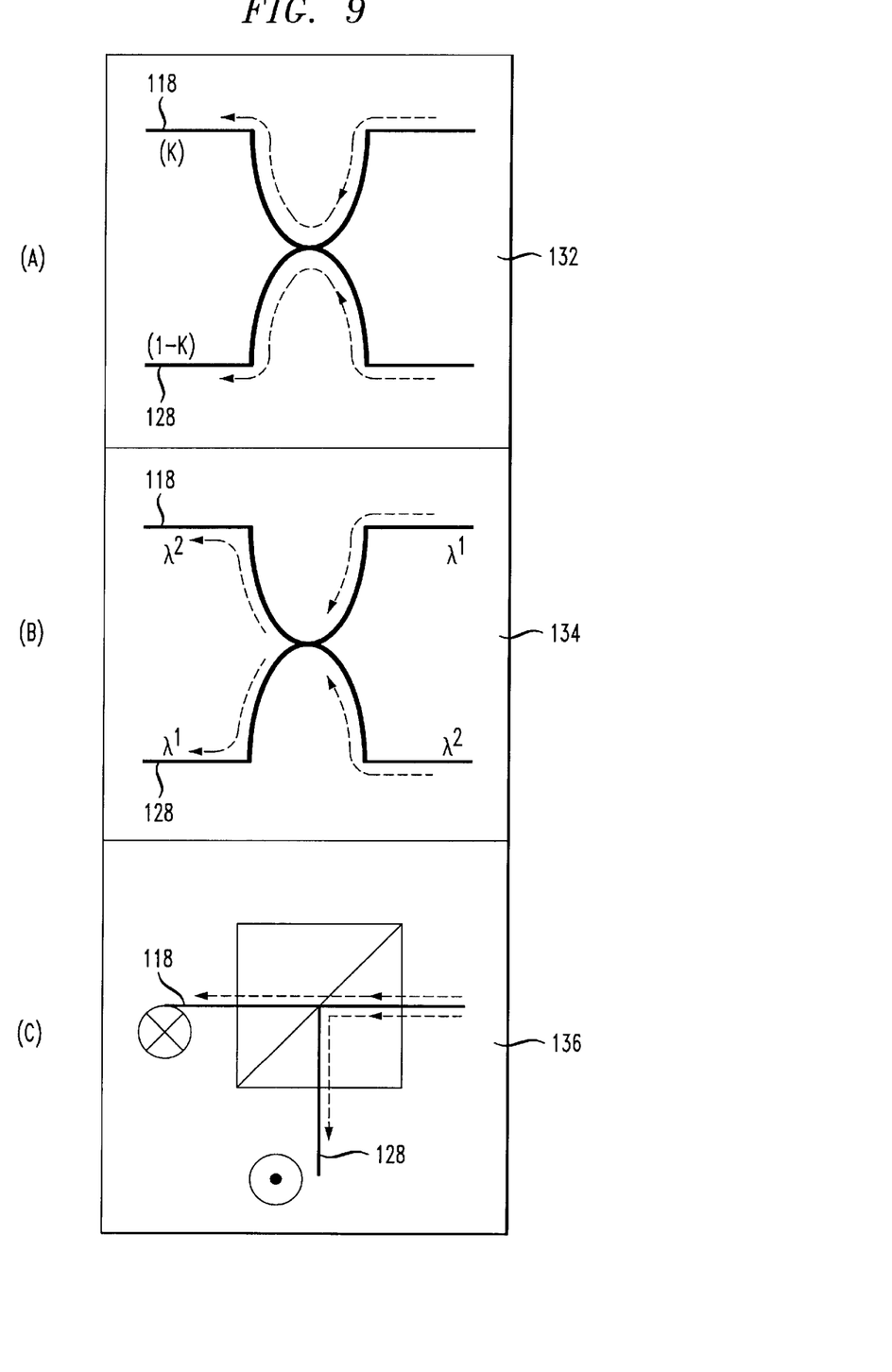
FIGS. 9A–9C illustrate alternative coupling arrangements for providing "pump splitting" in the two-stage amplifier embodiment of FIG. 8.

As mentioned above, coupling element 116 may comprise a variety of different arrangements, each capable of presenting different pump signals to the pair of amplifying stages. FIG. 9 illustrates three different, exemplary, embodiments for coupling element 116, where these elements may be used singly or in any appropriate combination. FIG. 9A illustrates a power splitter 132, which would require only a single pump input, and then provide output signals of different power levels, one denoted K and the other 1−K. For example, the power splitter may provide a first output at 30% of the input power and a second output at 70% of the power. When L2>L1 (for example), the higher power output signal would be applied as the pump input to second stage 103. In an alternative embodiment, a dual-wavelength coupling element 134, as shown in FIG. 9B, can be used. FIG. 9C illustrates a polarization splitter 136 that may be used as an alternative to either the power splitting or dual wavelength arrangements. In this case, a single input pump signal will be split into orthogonal polarization components, with a first component applied as an input along signal path 118 and the remaining, orthogonal component applied as an input along signal path 128.

Figure 10:
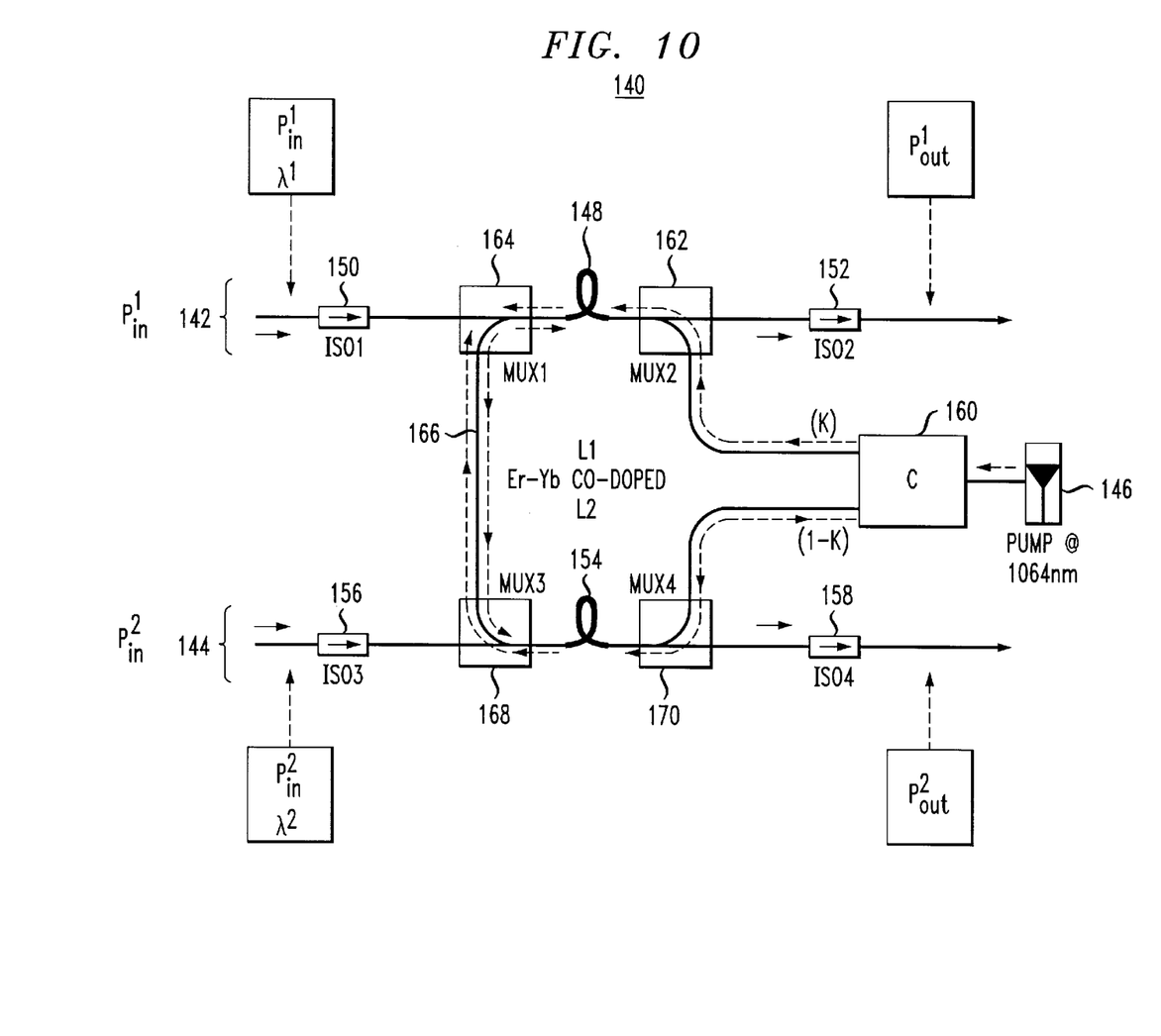
FIG. 10 illustrates another amplifier arrangement of the present invention, formed to use a single pump source (with residual pump power) to amplify two separate input signals.

An $Er^{+3}$—$Yb^{+3}$ co-doped fiber amplifier 140 that is capable of amplifying two different input signals with only one pump signal is shown in FIG. 10. A first fiber amplifier arrangement 142 is used to amplify a first input signal $P^1_{in}$ (at a first wavelength $\lambda_1$) and a second fiber amplifier arrangement 144 is used to amplify a second input signal $P^2_{in}$ (at a second wavelength $\lambda_2$), both using the same pump signal $P_{pump}$ emanating from a pump source 146 (pump signal $P_{pump}$ having a wavelength of, for example, 1064 nm). Referring to FIG. 10, first fiber amplifier 142 includes a section of $Er^{+3}$—$Yb^{+3}$ co-doped fiber 148 (having a predetermined length L1), disposed between an input isolator 150 and output isolator 152. Similarly, second fiber amplifier 144 includes a section of $Er^{+3}$—$Yb^{+3}$ co-doped fiber 154 (having a predetermined length L2) disposed between an input isolator 156 and an output isolator 158.

A coupling element 160, in this embodiment, for example, a power splitter, is used to provide separate pump input signals to amplifier sections 142 and 144. As shown, $KP_{pump}$ is a first output from coupling element 160 and is subsequently applied as an input to doped fiber section 148 of first amplifier 142 via a multiplexer 162 as a counter-propagating pump signal input. The amplified output signal, $P^1_{out}$ will thus propagate through output isolator 152 and thereafter exit amplifier 140. It is to be understood that a pair of pump sources may be applied as separate inputs to coupling element 160, where such an arrangement is well-known and useful in providing a "spare" pump source. A similar "pump sparing" arrangement is equally applicable to the various embodiments discussed below that utilize a coupling element to apply the pump signal to the amplifier.

In accordance with the present invention, any residual pump power $KP_{pump,res}$ remaining in first fiber section 148 is then tapped off by a multiplexer 164 and applied as an input to second amplifier section 144. In the particular arrangement as shown in FIG. 10, this residual pump power propagates along a signal path 166 and is coupled by a multiplexer 168 as a co-propagating pump input signal to second co-doped fiber section 154.

In a similar fashion, the remaining pump signal $(1-K)P_{pump}$ is a second output from coupling element 160 and is applied as an input, via a multiplexer 170, to second fiber amplifier 144. In particular, signal $(1-K)P_{pump}$ is applied as a counter-propagating pump signal input with the amplifier output signal $P^2_{out}$ passing through output isolator 158 and then exiting amplifier. 140. Any residual pump power, denoted $(1-K)P_{pump,\ res}$, will be coupled into multiplexer 168, propagate along signal path 166 and be applied as a residual pump input to first amplifier 142 via multiplexer 164.

The power split represented by "K" in FIG. 10 can be any desired amount and is, in general, a function of the wavelengths of the applied input signals, the lengths L1 and L2 of the doped fiber sections, and other related factors (such as the co-doping ratio within the fibers). In general, K can comprise any suitable value and can also be adjusted to provide optimum amplification of each signal.

Figure 11:
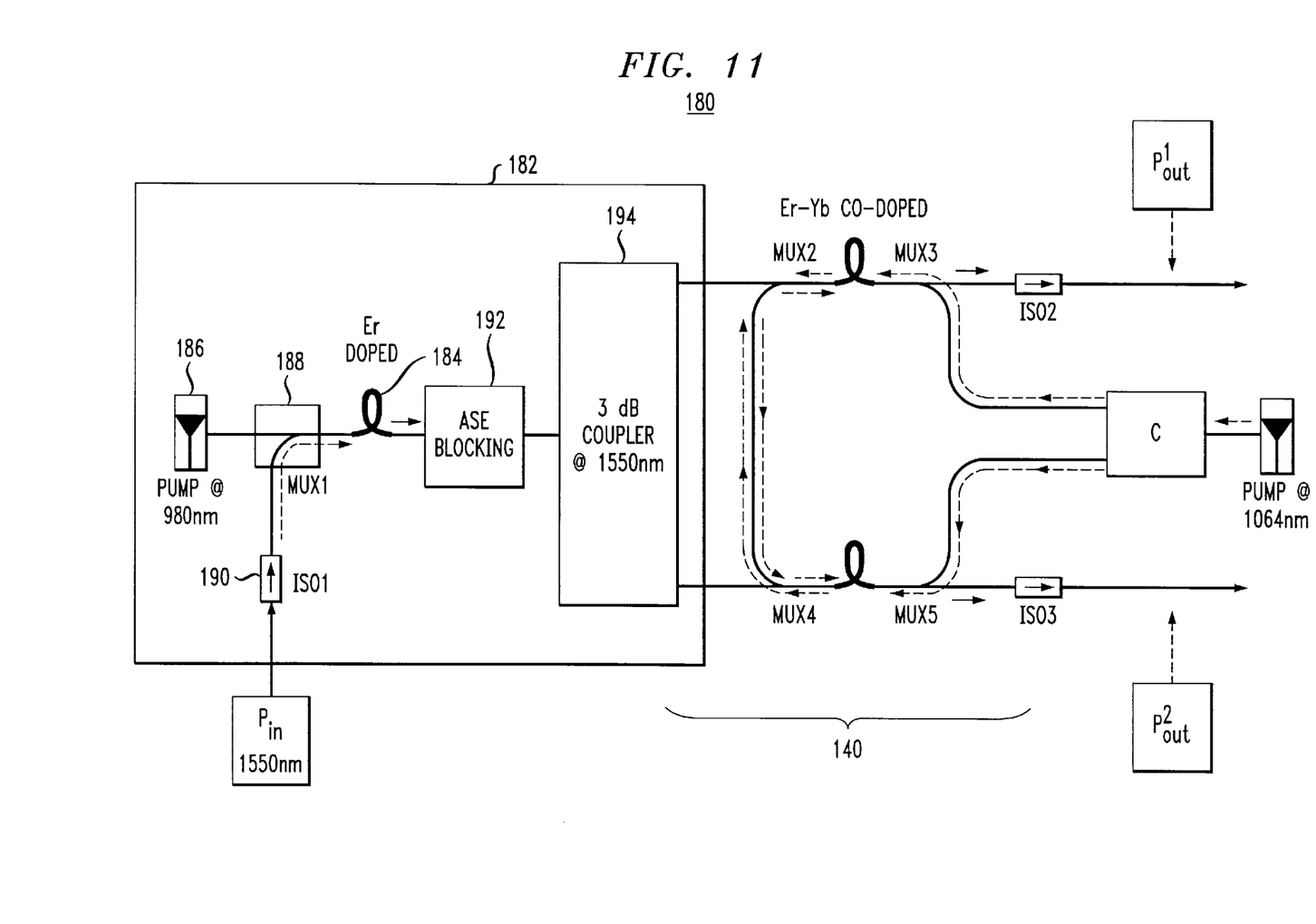
FIG. 11 contains an alternative embodiment of the present invention, including a fiber preamplifier (with its own, separate pump source) for use with the amplifier arrangement of FIG. 10.

Any of the various amplifier arrangements of the present invention described thus far may be modified to include a doped fiber preamplifier. FIG. 11 illustrates one such amplifier 180, which comprises amplifier 140 as described above in association with FIG. 10 and a separate preamplifier 182. As shown, preamplifier 182 comprises a section of erbium-doped fiber 184, with input signal $P_{in}$ and a pump signal $P_{pump,\ preamp}$ from pump source 186 combined within a multiplexer 188 and applied as co-propagating input signals to doped fiber 184 (an isolator 190 is disposed within the input signal branch to prevent any amplified signals from propagating backward into the signal source). The amplified output signal $P_{out,\ preamp}$ thereafter passes through an ASE blocking element 192 and is applied as an input to a 3 dB coupler 194. Coupler 194 functions to split the preamplified output signal in separate components, forming at least two separate input signals for amplifier 140.

Figure 12:
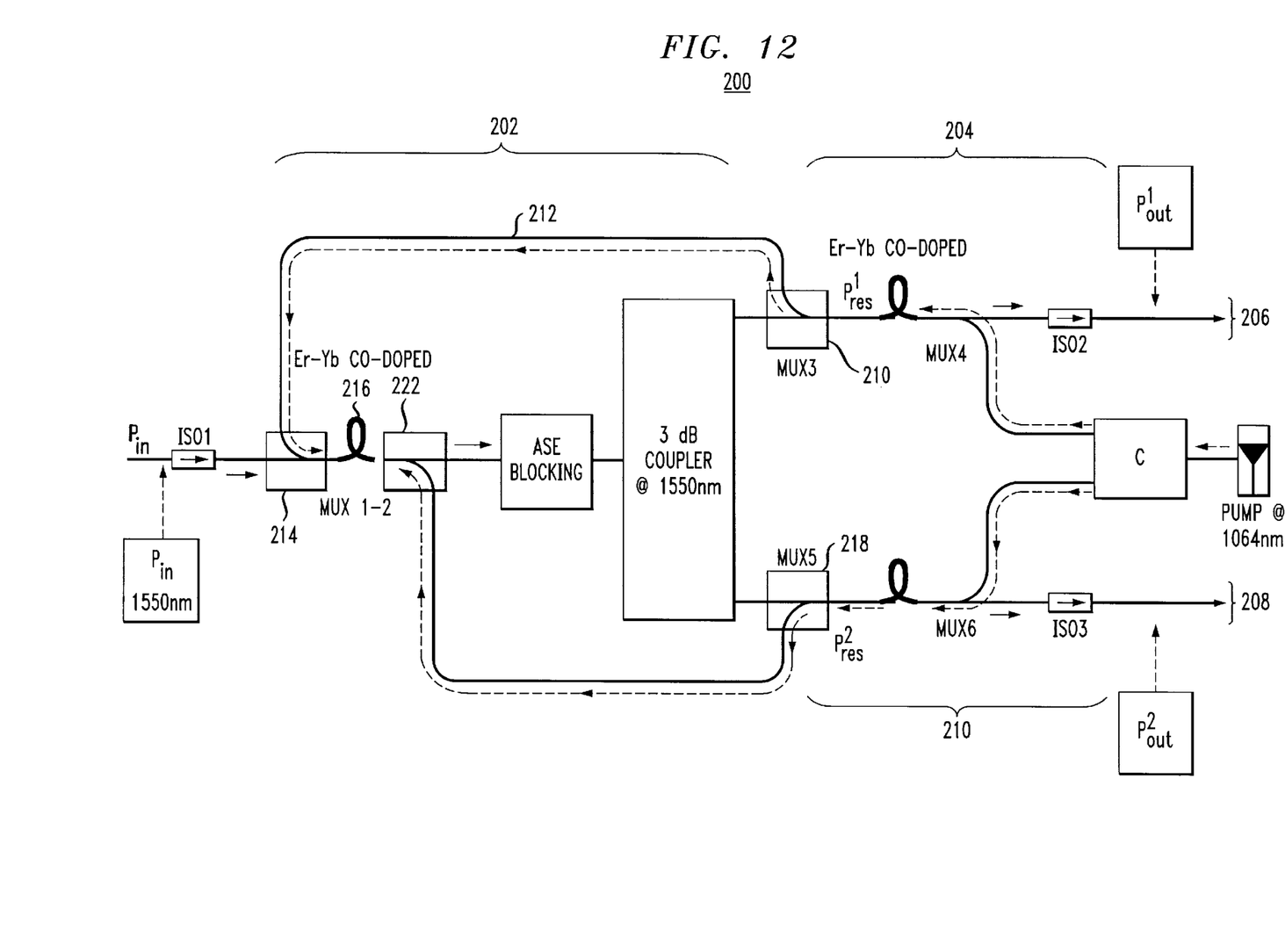
FIG. 12 illustrates an alternative to the arrangement of FIG. 11, using a single pump source to provide amplification in both the preamplifier and amplifier stages.

In an alternative preamplifier arrangement, 980nm pump source 186 of amplifier 180 can be eliminated and, in its place, the residual pump power available from first and second amplifiers 142 and 144 used as the pump source for the preamplifier. FIG. 12 illustrates an exemplary $Er^{+3}$—$Yb^{+3}$ co-doped fiber amplifier 200 including a preamplifier 202 and amplifier 204 which require only a single pump source. As shown, amplifier 204 is similar to amplifier 140 discussed above, except that the residual pump power signals $P^1_{res}$, $P^2_{res}$ available from branches 206 and 208, respectively, are now applied as inputs to preamplifier section 202. Referring to FIG. 12, a multiplexer 210 is used to remove the counter-propagating residual pump signal $P^1_{res}$ from branch 206, where this signal propagates along signal path 212 and is then coupled by a multiplexer 214 as a co-propagating pump input signal to a section of $Er^{+3}$—$Yb^{+3}$ co-doped fiber 216. The input information signal, $P_{in}$, first passes through an input isolator 218 and then is also applied as an input, via multiplexer 214 to doped fiber section 216.

In a similar fashion, residual pump power signal $P^2_{res}$ at second branch 208 of amplifier 204 is coupled into a multiplexer 218, propagates along a signal path 220 and is then coupled as a counter-propagating pump signal (via a multiplexer 222) into doped fiber 216 of preamplifier 200. In this arrangement, therefore, preamplifier 202 benefits from having both a co-propagating and counter-propagating pump signal. It is to be understood that various other arrangements may be used, including having both pumps applied as counter-propagating signals, both applied as co-propagating signals, or any other suitable arrangement.

Figure 13:
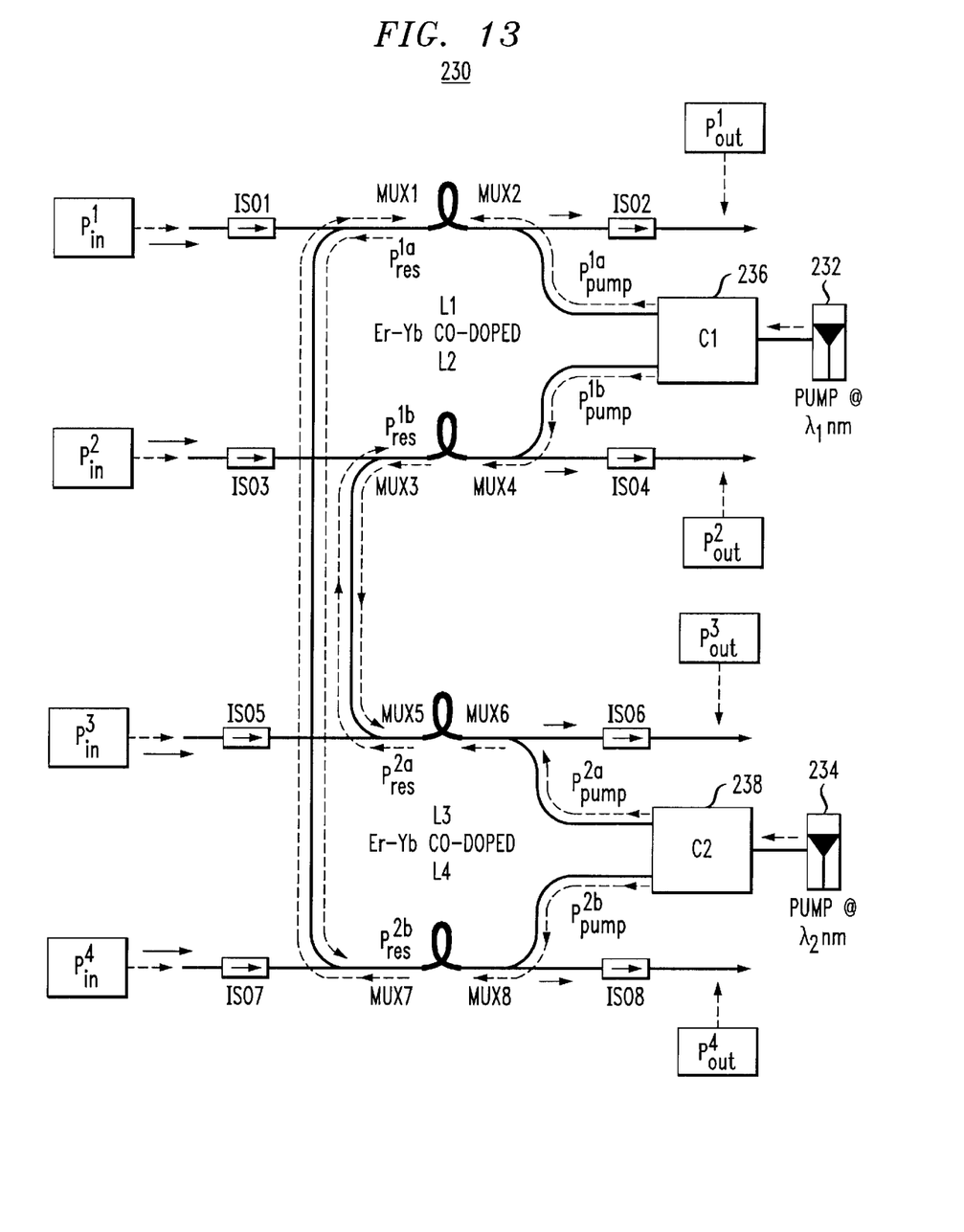
FIG. 13 illustrates a multiple input/multiple output $Er^{+3}$—$Yb^{+3}$ co-doped fiber amplifier of the present invention, using residual power along each branch as an additional pump power source for one or more other branches.

In general, an N input-N output doped fiber amplifier can be formed to efficiently use residual pump power in the mariner described above. FIG. 13 illustrates, in general form, a 4 input-4 output doped fiber amplifier 230, which utilizes a pair of (different wavelength) pump sources 232 and 234 to provide a set of four pump input signals, while re-using the residual power available along each amplifier branch. As shown, a pair of coupling elements 236 and 238 are used to divide each of the pump signals $P^1_{pump}$ and $P^2_{pump}$ into two separate pump signals, illustrated as $P^{1a}_{pump}$, $P^{1b}_{pump}$, $P^{2a}_{pump}$, and $P^{2b}_{pump}$. Each of these pump signals are applied, in this exemplary embodiment, as counter-propagating pump signals. The residual power pump signals in this arrangement, denoted $P^{1a}_{res}$, $P^{1b}_{res}$, $P^{2a}_{res}$ and $P^{2b}_{res}$, are then removed via associated multiplexers and thereafter applied as co-propagating pump inputs to other designated amplifier branches in the system. In the particular embodiment of FIG. 13, the pump sources are "crossed" so that the co-propagating residual pump is of a wavelength other that the counter-propagating pump signal.

It is to be understood that the various arrangements described above are exemplary only and there exist many other embodiments and arrangements for re-using residual pump power in a multi-stage rare-earth doped fiber amplifier, and all are considered to fall within the spirit and scope of the present invention as defined by the claims appended hereto.

What is claimed is:

1. A rare-earth doped fiber amplifier for providing optical amplification to an applied input signal, $P_{in}$, using an optical pump signal, $P_{pump}$, the amplifier comprising a first section of rare-earth doped fiber of length L1, defined as having a first end and a second end, the input signal applied as an input to said second end of said first section;

a second section of rare-earth doped fiber of length L2, defined as having a first end and a second end, the input signal applied as an input to said second end of said second section;

a first coupler for applying an optical pump signal to the first end of the second section of doped fiber to form a counter-propagation pumping arrangement;

a second coupler for removing residual pump power from the second end of the second section of doped fiber;

a third coupler for applying the removed residual pump power to the first end of the first section of doped fiber to form a counter-propagation pumping arrangement with the applied residual power pump signal.

2. A rare-earth doped fiber amplifier as defined in claim 1 wherein the amplifier includes an amplified spontaneous emission (ASE) blocking element disposed between the first section of doped fiber and the second section of doped fiber.

3. A rare-earth doped fiber amplifier as defined in claim 1 wherein each coupler comprises a wavelength division multiplexer.

4. A rare-earth doped fiber amplifier as defined in claim 1 wherein the first section of doped fiber is defined as an input stage and the second section of doped fiber is defined as an output stage.

5. A rare-earth doped fiber amplifier as defined in claim 4 wherein the amplifier further comprises an input isolator disposed at the input of first section of doped fiber and an output isolator disposed at the output of the second section of doped fiber.

6. A rare-earth doped fiber amplifier as defined in claim 4 wherein the optical pump signal comprises a wavelength in the range of 980–1064 nm.

7. A rare-earth doped fiber amplifier as defined in claim 4 wherein the length of the output stage (L2) is greater than the length of the input stage (L1).

8. A rare-earth doped fiber amplifier as defined in claim 7 wherein L2 is approximately equal to 11.5 m and L1 is approximately equal to 6.5 m.

9. A rare-earth doped fiber amplifier as defined in claim 1 wherein each section of doped fiber comprises $Er^{+3}$—$Yb^{+3}$ doped fiber.

10. A multi-stage fiber amplifier comprising a plurality of separate sections of co-doped optical fiber;

at least one optical signal, $P_{in}$, to be amplified, and applied as a first input to a co-doped optical fiber of the plurality of co-doped optical fibers;

a pump signal, $P_{pump}$, applied as an input to the last section of co-doped optical fiber in said plurality of co-doped optical fibers, wherein the residual pump power from said last section of co-doped optical fiber is applied as a pump signal to the preceding stage of the multi-stage fiber amplifier;

a first wavelength division multiplexer coupled to said last section of co-doped optical fiber for removing residual pump power from said last section of co-doped optical fiber; and a plurality of additional wavelength division multiplexers coupled to others of the plurality of co-doped optical fibers for providing residual pump power as an amplifier input to said others of said plurality of co-doped optical fibers.

11. A multi-stage fiber amplifier as defined in claim 10 wherein the plurality of separate sections of doped optical fiber are disposed in series and the amplifier further comprises a plurality of amplified spontaneous emission filters, a separate filter disposed between adjacent ones of the separate sections of co-doped optical fiber;

an input isolator disposed prior to a first section of co-doped optical fiber;

an output isolator disposed beyond the last section of co-doped optical fiber.

12. A multi-stage fiber amplifier as defined in claim 10 wherein residual pump power at any stage in said multi-stage amplifier is applied as a pump signal input to a preceding stage of said multi-stage amplifier.

* * * * *